(12) United States Patent
Carmen, Jr. et al.

(10) Patent No.: US 6,983,783 B2
(45) Date of Patent: Jan. 10, 2006

(54) MOTORIZED SHADE CONTROL SYSTEM

(75) Inventors: Lawrence R. Carmen, Jr., Bath, PA (US); Michael E. Lockley, Bethlehem, PA (US); Justin J. Mierta, Emmaus, PA (US); David J. Dolan, Bethlehem, PA (US); Stephen M. Ludwig, Jr., Bethlehem, PA (US); Thomas W. Brenner, Wescosville, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 10/660,061

(22) Filed: Sep. 11, 2003

(65) Prior Publication Data

US 2004/0250964 A1    Dec. 16, 2004

Related U.S. Application Data

(60) Provisional application No. 60/477,626, filed on Jun. 10, 2003.

(51) Int. Cl.
*A47H 1/00* (2006.01)

(52) U.S. Cl. .............................. 160/120; 160/176.1 P
(58) Field of Classification Search ................ 160/120, 160/167 R, 173 R, 176.1 P
See application file for complete search history.

(56) References Cited

U.S. PATENT DOCUMENTS

| | | | | |
|---|---|---|---|---|
| 4,618,804 A | * | 10/1986 | Iwasaki ........................ 318/16 |
| 4,881,219 A | * | 11/1989 | Jacquel ........................ 700/90 |
| 5,532,560 A | * | 7/1996 | Element et al. .............. 318/266 |
| 5,729,103 A | * | 3/1998 | Domel et al. ................ 318/283 |
| 6,069,465 A | * | 5/2000 | de Boois et al. ........... 318/675 |
| 6,201,364 B1 | * | 3/2001 | Will et al. ................... 318/466 |
| 6,497,267 B1 | * | 12/2002 | Azar et al. ................... 160/310 |
| 6,598,652 B1 | * | 7/2003 | Montesinos Alonso ..... 160/331 |
| 2003/0015302 A1 | * | 1/2003 | Pessina et al. .............. 160/331 |

FOREIGN PATENT DOCUMENTS

| | | | |
|---|---|---|---|
| DE | 4008940 | * | 9/1991 |
| DE | 9114598 | * | 6/1993 |

\* cited by examiner

*Primary Examiner*—Bruce A. Lev
(74) *Attorney, Agent, or Firm*—Drinker Biddle & Reath LLP

(57) ABSTRACT

A motorized shade control system includes electronic drive units (EDUs) having programmable control units directing a motor to move an associated shade in response to command signals directed to the control units from wall-mounted keypad controllers or from alternate devices or control systems connected to a contact closure interface (CCI). Each of the EDUs, keypad controllers and CCIs of the system is connected to a common communication bus. The system provides for initiation of soft addressing of the system components from any keypad controller, CCI or EDU. The system also provides for setting of EDU limit positions and assignment of EDUs to keypad controllers from the keypad controllers or CCIs. The system may also include infrared receivers for receiving infrared command signals from an infrared transmitter.

31 Claims, 14 Drawing Sheets

MOTORIZED SHADE CONTROL SYSTEM

CROSS-REFERENCE TO RELATED APPLICATIONS

The present application claims priority from U.S. Provisional Application No. 60/477,626, filed Jun. 10, 2003, which is incorporated herein in its entirety.

FIELD OF THE INVENTION

The present invention relates to motorized shades and more particularly to a system for controlling motorized shades.

BACKGROUND OF THE INVENTION

It is known to control the operation of a motorized shade by transmitting command signals to the motorized shade from a location remote from the shade, directing the motor to move the shade. Known control systems include wall-mountable keypads linked to motorized shades by wire communication lines. It is also known to transmit shade control signals from one location to another using wireless communication links such as radio-frequency or infrared transmission.

Shade control systems are known that have multiple keypads and multiple motorized shades interconnected by a communications network for transmitting control signals between keypads and motorized shades included in the system. Known forms of shade control communication networks include hub systems in which a central group controller is connected to multiple motorized shades and to multiple keypads for directing signals from the keypads to the shades. Known forms of shade control communication networks also include segmented constructions in which sub-networks of keypads communicating with motorized shades are, in turn, interconnected by a communications link.

SUMMARY OF THE INVENTION

According to one aspect of the present invention, a shade control system includes a plurality of drive units each having a motor adapted for moving an associated shade member and a plurality of drive unit controllers each capable of generating command signals for directing at least one of the drive units to move the associated shade member. The shade control system also includes a communication bus to which each of the drive units and drive unit controllers is connected in a common arrangement such that each one of the drive units and drive unit controllers can communicate with every other drive unit and drive unit controllers.

According to one embodiment, the shade member associated with each drive member is a shade fabric wound onto a roller tube. The drive unit controllers preferably include at least one keypad controller having an open limit actuator and a close limit actuator for generating command signals for moving the associated shade fabric of at least one of the drive units to an open limit position and a close limit position. The keypad controller also preferably includes a raise actuator and a lower actuator for generating command signals for moving the associated shade fabric of at least one of the drive units through raise and lower position adjustments.

The system may also include an infrared transmitter for transmitting infrared command signals to a keypad controller having an internal infrared receiver or to an external infrared receiver adjacent one of the drive units. The system may also include a contact closure interface having inputs for connection of an alternate device or control system to the contact closure interface for generating command signals for controlling one or more of the drive units.

According to one embodiment, each of the keypad controllers includes a programmable microprocessor for programming the shade control system in response to actuation of the keypad actuators in a predetermined combination or sequence. The microprocessor is preferably programmed to provide for (i) automatic addressing of all system components, (ii) limit setting for the drive units and (iii) assigning drive units to keypad controllers. The system may also include contact closure interfaces or drive units including microprocessors capable of programming the shade control system.

DESCRIPTION OF THE INVENTION

Figure 1:
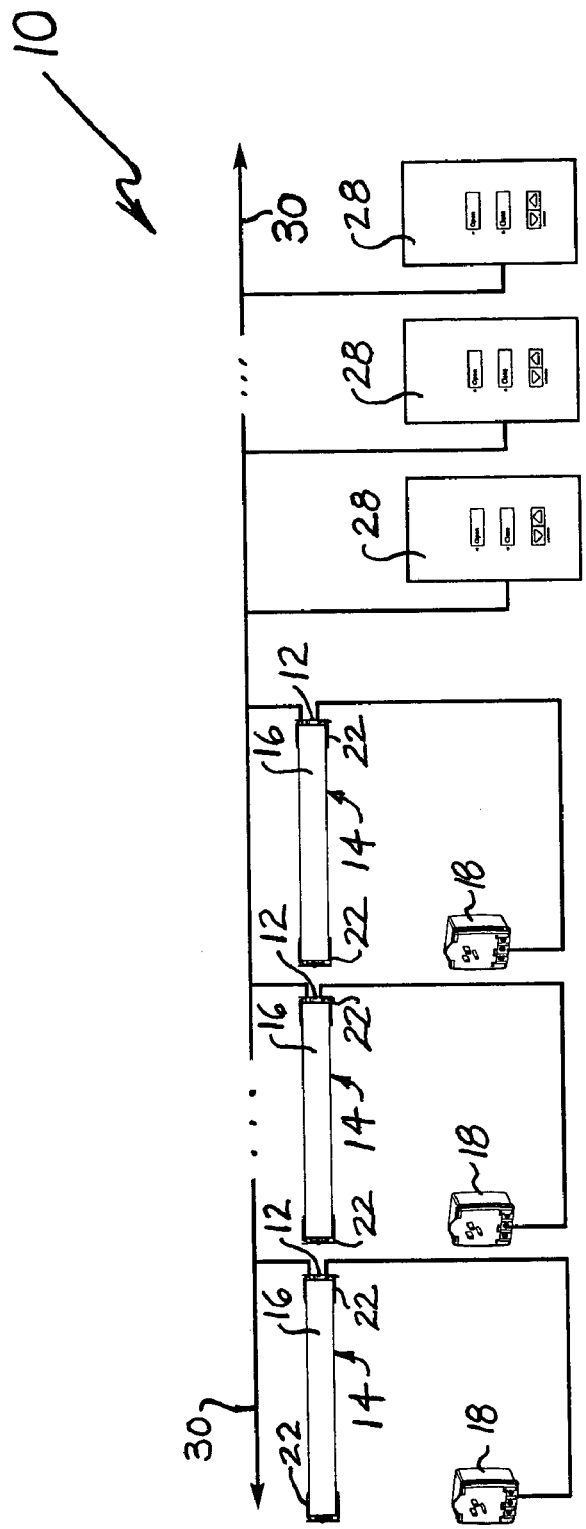
FIG. 1 is a schematic view of a motorized shade control system according to the present invention.

Referring to the drawings, where like numerals identify like elements, there is shown a motorized shade control system 10 according to the present invention. As will be described in greater detail, the shade control system of the present invention uses a communication network that provides for communication between each component of the system and every other component of the system. This arrangement facilitates system programming, including facilitating soft addressing of all system components from multiple locations.

I. The Shade Control System

Figure 2:
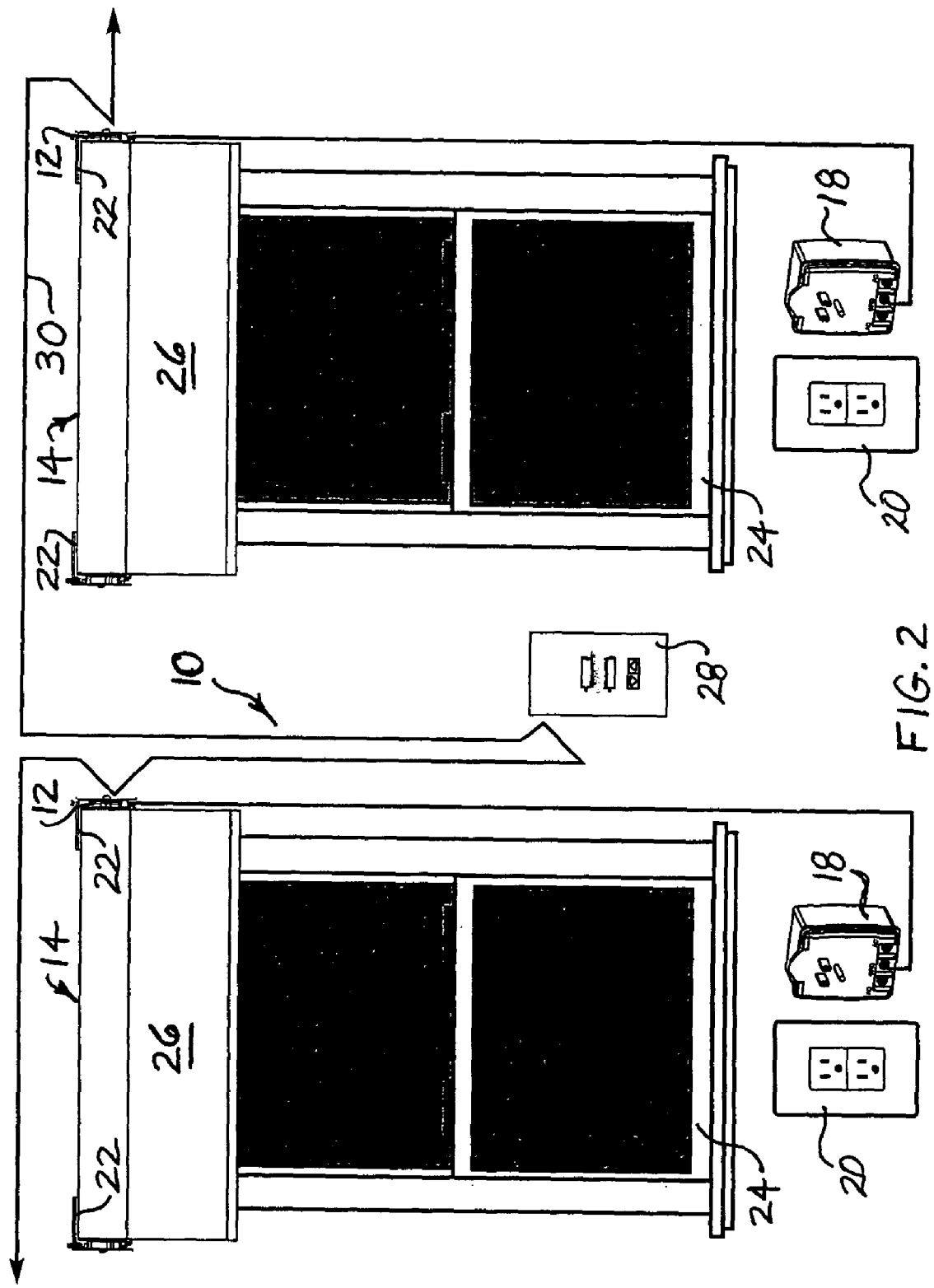
FIG. 2 is a view, schematic in part, of a portion of a motorized shade control system according to the present invention.

Referring to FIGS. 1 and 2, the control system 10 includes a plurality of electronic drive units 12 each rotatingly driving a roller tube 16 of a motorized shade 14. Each of the drive units 12 is connected to a transformer 18 to receive power at the voltage required by the drive unit 12. The transformers 18 are plug-in transformers connectable to a source of power, such as a wallbox receptacle 20 as shown in FIG. 2, for example. Each motorized shade 14 being controlled by the shade control system 10 includes brackets 22 at opposite ends of the roller tube 16. As shown in FIG. 2, the brackets 22 rotatably secure the motorized shade 14 adjacent a window or other structure 24, for example to shade the window by a shade fabric 26 wound onto the roller tube 16.

The motorized shade control system 10 of FIGS. 1 and 2 also includes keypad controllers 28 for controlling the operation of the electronic drive units 12. The keypad controllers 28 are preferably mounted in a readily accessible location remote from the drive units 12, such as in a wallbox installation in a manner similar to wall-mounted controls for lights and ceiling fans. Each of the keypad controllers 28 is capable of controlling one or more of the drive units 12 of the system 10. The number of drive units 12 controlled by each of the keypad controllers 28 will depend on the assignment of the drive units 12 to the keypad controllers 28 that has been programmed into the system 10 in the manner described below.

The motorized shade control system 10 includes a communication network providing for transmission of control signals between the keypad controllers 28 and the electronic drive units 12. As shown schematically in FIGS. 1 and 2, all of the keypad controllers 28 and drive units 12 of the control system 10 are connected to one common communication bus line 30. The use of a common communication bus line 30 provides for programming of the control system 10 from any of the keypad controllers 28. This arrangement facilitates modification of the system programming, which may be necessary for changing the assignment of the electronic drive units 12, for example, or for removal and replacement of system components.

Figure 3:
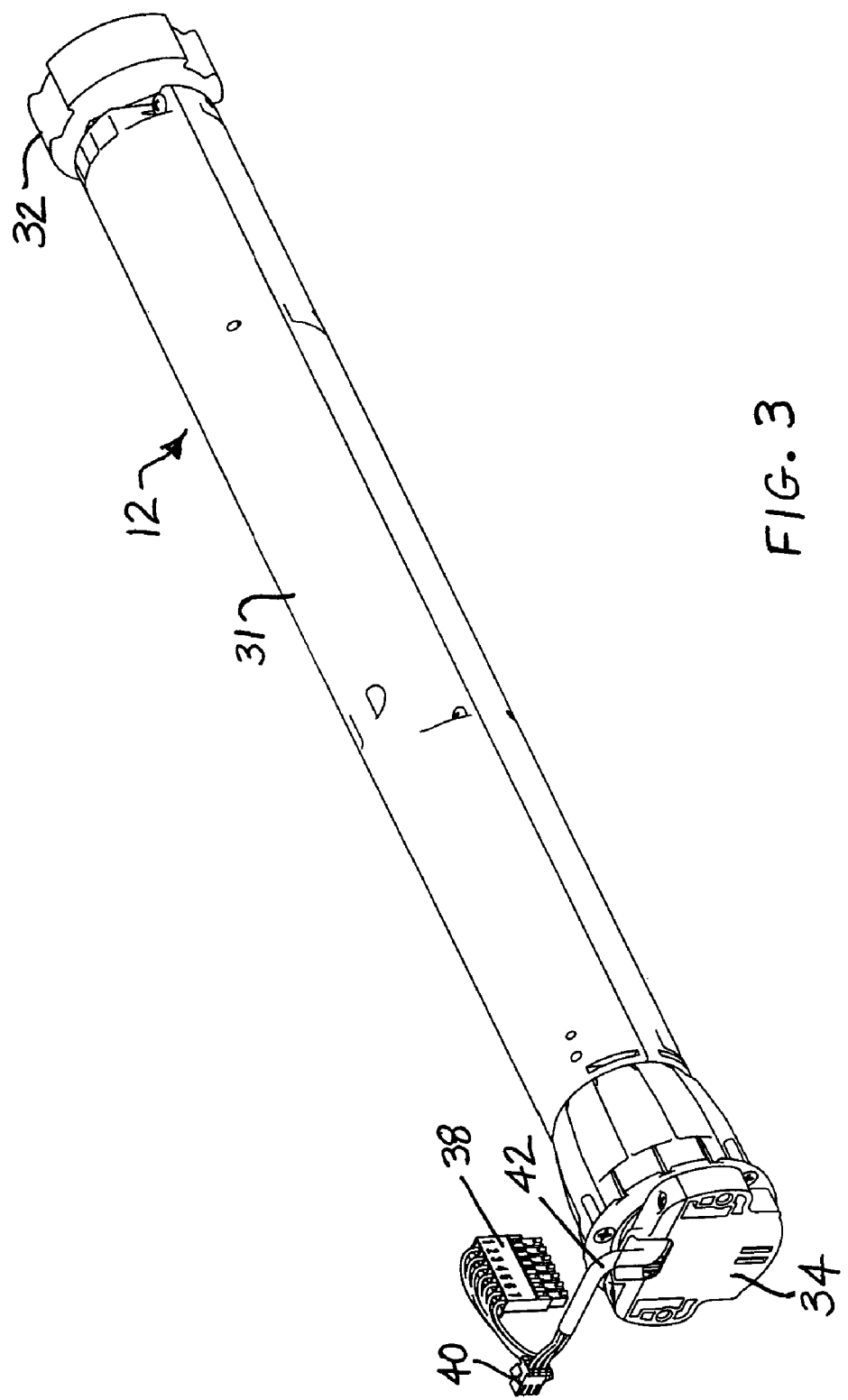
FIG. 3 is a perspective view of an electronic drive unit (EDU) of the shade control system of FIG. 1.
Figure 4:
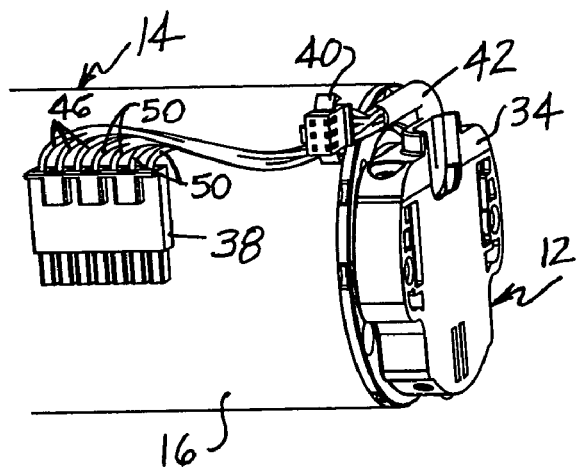
FIG. 4 is a perspective view of the electronic drive unit of FIG. 3 received within a roller tube of a motorized shade.

Referring to FIGS. 3 and 4, the electronic drive units 12 of control system 10 are shown in greater detail. Each of the drive units 12 includes an elongated motor 31 rotatably driving a bearing 32. The bearing 32 is notched about its outer periphery to facilitate engagement between the bearing 32 and an interior of the roller tube 16 in which the motor 31 is received. Each of the electronic drive units 12 further includes a control unit 34 attached to the motor 31 opposite the bearing 32 such that the control unit 34 is positioned adjacent an end 36 of the roller tube 16.

The control unit 34 of the electronic drive unit 12 includes a microprocessor capable of monitoring the operation of the motor 31 to track the position of the associated shade fabric 26 as it is raised and lowered with respect to the roller tube 16. The control unit 34 also controls the motor 31 to adjust the position of the shade fabric 26 in accordance with preset shade positions programmed into the control system 10. As will be described below, the control unit microprocessors are programmable to provide for system programming at each of the electronic drive units 12 as well as at each of the keypad controllers 28.

Each of the electronic drive units 12 further includes a male connector 38 to which are connected conductors to provide wiring connection for power and communications transmissions for the drive unit 12. The drive unit 12 further includes an accessory connector 40 for connection of an infrared receiver, as described below for example, to the electronic drive unit 12. The male connector 38 and accessory connector 40 are attached to the control unit 34 of the drive unit 12 by a wire harness 42.

Figure 5:
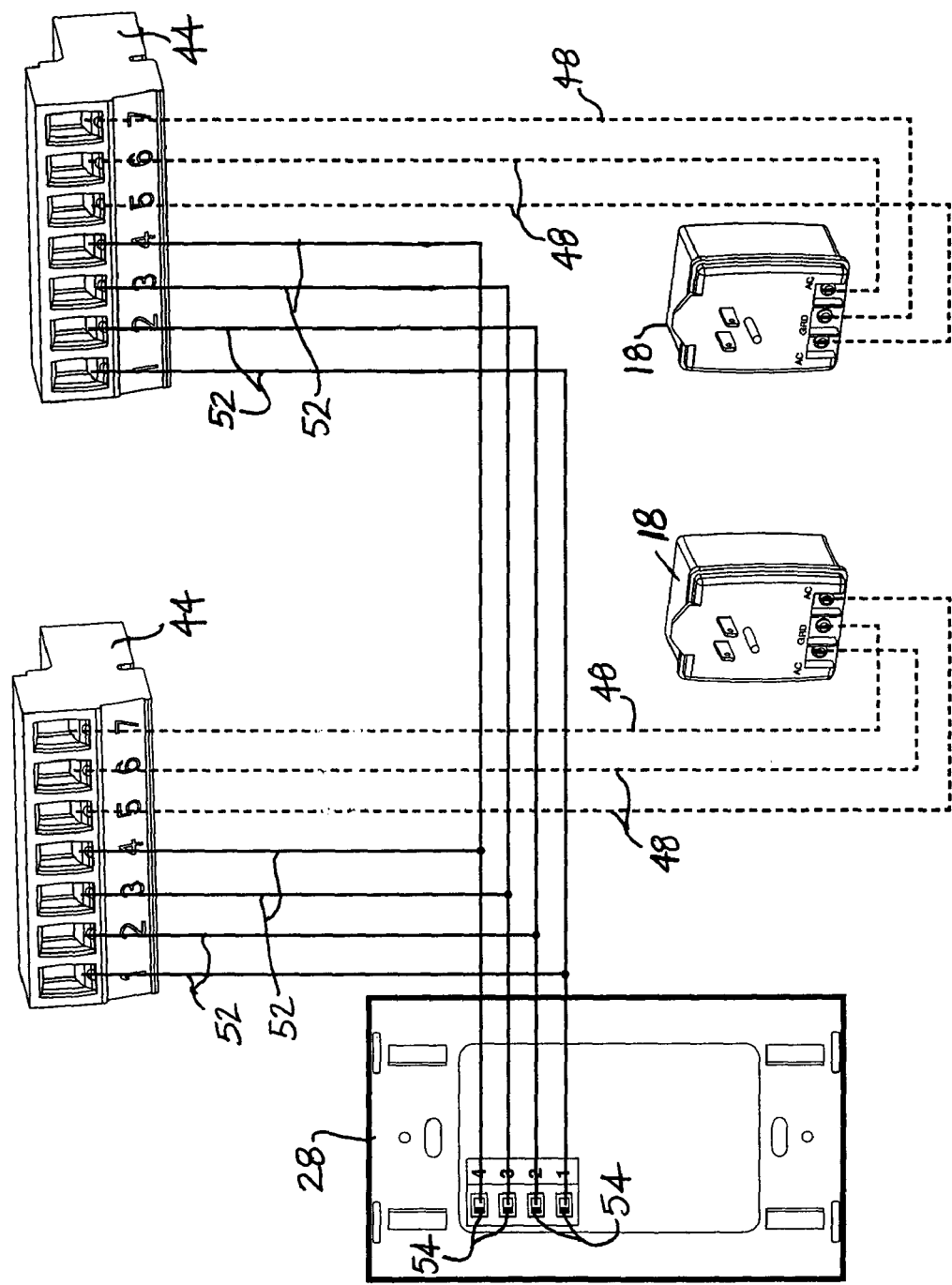
FIG. 5 is a view, schematic in part, of the wiring connections for the shade control system of FIG. 2.

Referring to FIG. 5, the wiring connections between the keypad controller 28 of FIG. 2 and the electronic drive units 12, and between the drive units 12 and the plug-in transformers 18, are shown in further detail. The shade control system 10 includes female connectors 44 engageable with the male connectors 38. The engagement between the male and female connectors 38, 44 links three conductors 46 from the wire harness 42 of the drive units 12 to three conductors 48 attached to transformers 18. That connection between the conductors 46, 48 through the male and female connectors 38, 44 provides for power transfer from the transformers 18 to the electronic drive units 12. The male and female connectors 38, 44 also link four conductors 50 from the wire harnesses 42 of the electronic drive units 12 to conductors 52, to transmit signals between the electronic drive units 12 and the keypad controller 28 and to power the keypad controller. As shown in FIG. 5, the conductors 52 are connected to those of the other drive unit 12 connected to terminal connectors 54 of the keypad controller 28.

Figure 6:
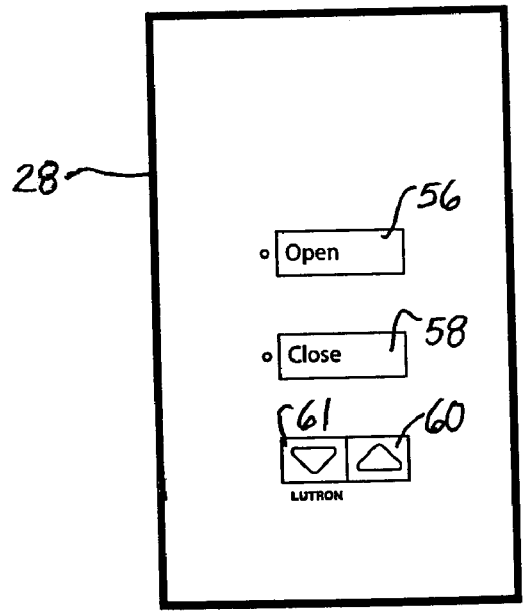
FIG. 6 is a front elevation view of the keypad controller of FIG. 2.

Referring to FIG. 6, the keypad controller 28 of the motorized shade control system 10 of FIG. 2 is shown in greater detail. The keypad controller 28 includes "open" and "close" buttons 56, 58, for respectively directing the electronic drive units 12 assigned to that keypad controller 28 to drive the associated shade fabrics 26 to full open and full close limit positions. The keypad controller 28 further includes raise/lower buttons 60, 61 (or other raise/lower actuator) for fine-tuning adjustment of the shade position.

The keypad controllers 28 of the control system 10 receive power from the electronic drive units 12. This arrangement, however, is not required. It is conceivable, for example, that the keypad controllers 28 could be connected to a power source separate from that powering the electronic drive units 12, and could be battery-powered, for example.

Figure 8:
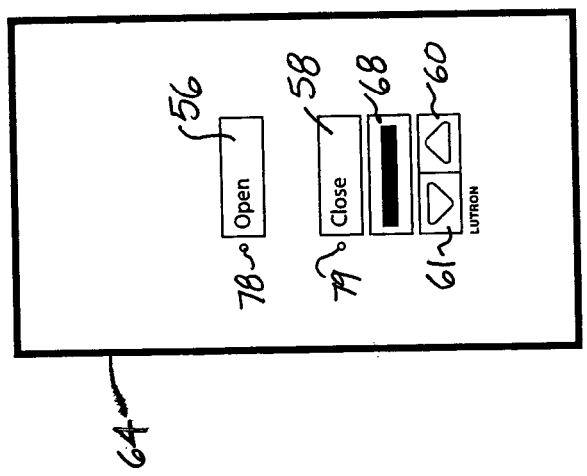
FIG. 8 is a front elevation view of a second alternative keypad controller.
Figure 7:
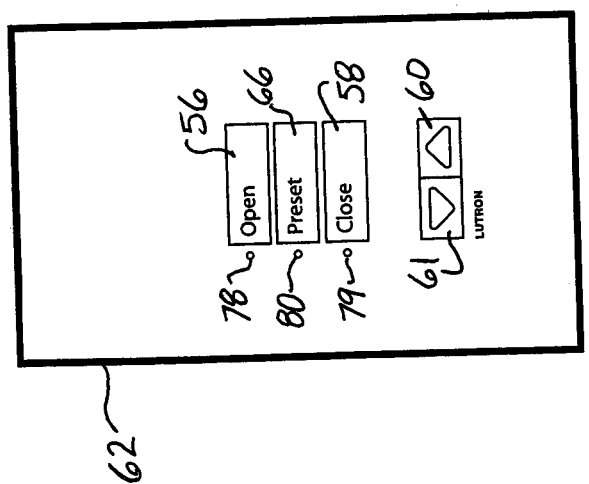
FIG. 7 is a front elevation view of an alternative keypad controller for use with a control system according to the present invention.

Referring to FIGS. 7 and 8, there are shown alternate keypad controllers 62, 64 for use in the shade control system 10 of the present invention. Keypad controller 62 of FIG. 7, in a fashion similar to keypad controller 28 of FIG. 6, includes open and close buttons 56, 58 and raise/lower buttons 60, 61. The keypad controller 62, however, further includes a preset button 66 for directing the assigned drive units 12 to raise or lower the associated shade fabrics 26 to a position that has been pre-programmed into the microprocessor of the keypad controller 62. A keypad controller according to the present invention could alternatively include multiple preset buttons.

The present invention is not limited, however, to any particular arrangement of actuators. For example, it is not a requirement of the present invention that the keypad controllers include open, close and raise/lower adjustment actuators. It is also conceivable that the keypad controller could include actuators for directing one or more of the drive units to perform other control functions from those described above. It is also conceivable that the keypad controller could be a "dual" keypad having first and second sets of actuators with each set of actuators controlling the operation of one or more of the drive units of the control system.

Figure 9:
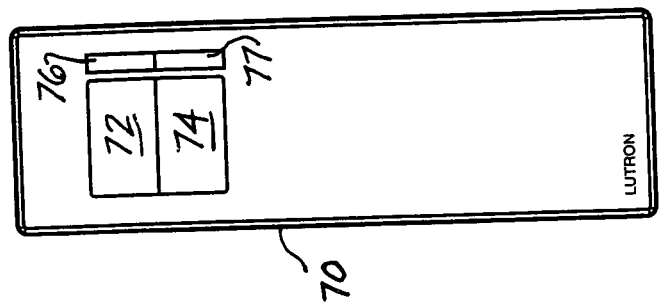
FIG. 9 is a front elevation view of an infrared transmitter for use with a control system according to the present invention.

Keypad controller 64 of FIG. 8, similar to keypad controller 28 of FIG. 6, includes open and close buttons 56, 58, and raise/lower buttons 60, 61. Keypad controller 64 further includes an IR window 68 for transmission of infrared control signals to an IR receiver located within the keypad controller 64 from an IR transmitter, such as transmitter 70 shown in FIG. 9. The IR transmitter 70 includes full open and full close buttons 72, 74 and raise/lower buttons 76, 77 for generating corresponding IR command signals to the internal IR receiver of keypad controller 64. The keypad controller 64 functions in response to the infrared signals received from the IR transmitter 70 in the same fashion as if a user were actuating the buttons 56, 58 and actuator 60 of the keypad controller. It should be noted, however, it is not necessary that actuation of the IR transmitter actuators direct one or more of the drive units in exactly the same manner as the keypad actuators. It is conceivable, for example, that the transmitter 70 could include a microprocessor programmed to direct one or more of the drive units to move the associated shade to different positions than would result from similar actuation using the keypad actuators.

Each of the keypad controllers 28, 62, 64 of FIGS. 6–8 includes LED indicators 78, 79 respectively located beside the open and close buttons 56, 58. Keypad controller 62 also includes an LED indicator 80 located beside the preset selector button 66. The LED indicators 78, 79, 80 provide visual indications during various steps in the programming of the control system 10 in the manner described below. The keypad controllers could also include LED arrays for running multiple LED logic. For example, a linear array of LEDs could be included in a keypad controller to provide a visual indication of shade position.

Each of the keypad controllers 28, 62, 64 of FIGS. 6–8 is described above as including an arrangement of buttons dedicated to performing particular functions upon actuation (e.g., an "open" button 56 and a "close" button 58). It should be understood, however, that the keypad controllers are not limited to the particular arrangement shown, or to any one set arrangement. It is conceivable, for example, that the keypad controllers could be button-by-button programmed, or re-programmed, to a different arrangement of assigned functions from that shown (e.g., re-programming buttons 56 and 58 to be "close" and "open" buttons, respectively).

Figure 10:
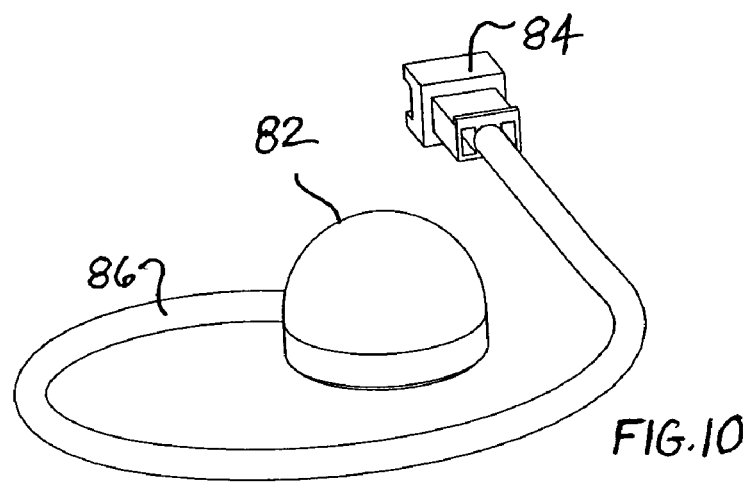
FIG. 10 is a perspective view of an infrared receiver for use with the electronic drive unit of FIGS. 3 and 4.

Referring to FIG. 10, the control system 10 may also include an external infrared receiver 82 having a connector 84 secured to a cable 86. The connector 84 is adapted for connection to the accessory connector 40 of the control unit 34 of an electronic drive unit 12 to provide for transmission of infrared command or programming signals from an infrared transmitter, such as transmitter 70 to the microprocessor of the control unit 34.

Figure 11:
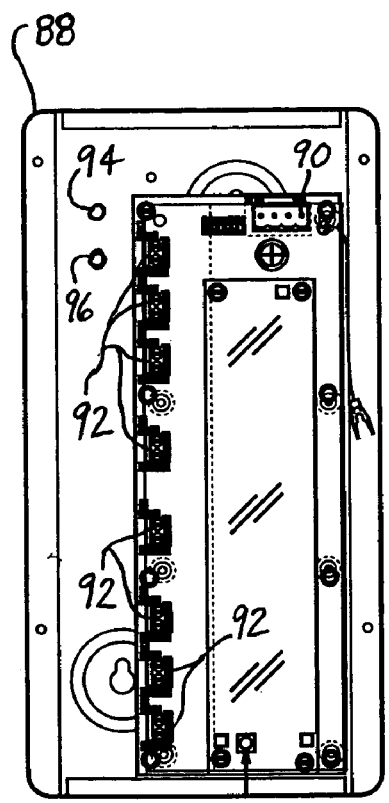
FIG. 11 is a front elevation view of a contact closure interface for use with a control system according to the present invention.

The control system 10 may also include a contact closure interface (CCI) 88, shown in FIG. 11. The CCI 88 includes terminal connectors 90 for connecting four conductors from the main communication bus 30 for transfer of programming or control signals between the CCI 88 and the communication bus 30 and for powering the CCI. The CCI 88 includes eight contact closure inputs 92 for connecting the CCI to an alternate control device, such as a touchscreen, or to an alternate control system, such as a lighting control system for example. The connections provided by the inputs 92 of the CCI 88 provide for integration of alternate devices and control systems with the control system 10 of the present invention. The CCI 88 functions in a fashion similar to a keypad controller of the control system 10 to provide for programming of the control system 10 or for controlling electronic drive units 12 assigned to the CCI 88. In a fashion similar to the "open" and "close" LED indicators 78, 79 of keypad controller 28, the CCI 88 includes LED indicators 94, 96 to provide visual indications to a user of the CCI-connected device or system during programming of the control system 10. Also in a similar fashion to the keypad controllers, it is conceivable that the CCIs could run multiple LED logic such as a linear array indicating position of associated shade fabrics being controlled by a CCI-connected device. It is also conceivable that the CCI inputs could be configured into multiple sets of inputs each operating a different grouping of drive units compared to the other set of inputs.

In the control system 10 shown in FIGS. 1 and 2, each of the electronic drive units 12 is connected to its own transformer 18 for receiving power at the appropriate voltage required by the drive unit 12. Turning to FIGS. 12–16, there is shown a motorized shade control system 98 including a power transmission panel 100 capable of distributing power to multiple electronic drive units 102. The power transmission panel 100, as shown in FIG. 13 and in the enlarged detail view of FIG. 14, includes terminals 104 for connecting the panel 100 to a source of power, such as AC line voltage. The power transmission panel 100 also includes a distributor 106 that links the line-voltage terminals 104 with multiple terminal blocks 108 to direct power at a reduced voltage appropriate for the electronic drive units 102 to the terminal blocks 108.

As shown in the enlarged detail view of FIG. 15, each of the terminal blocks 108 of the power transmission panel 100 is adapted for connection to seven conductors extending between the power transmission panel and one of the electronic drive units 102. The seven conductors include three conductors 110 that, in a manner similar to the conductors 46 of the electronic drive units 12, provide for power transfer from the terminal block 108 of the power transmission panel 100 to the electronic drive unit 102. The seven conductors also include four conductors 112 that, in a manner similar to the conductors 50 of the electronic drive units 12, provide for transfer of control and programming signals between the power transmission panel 100 and one of the electronic drive units 102.

Figure 12:
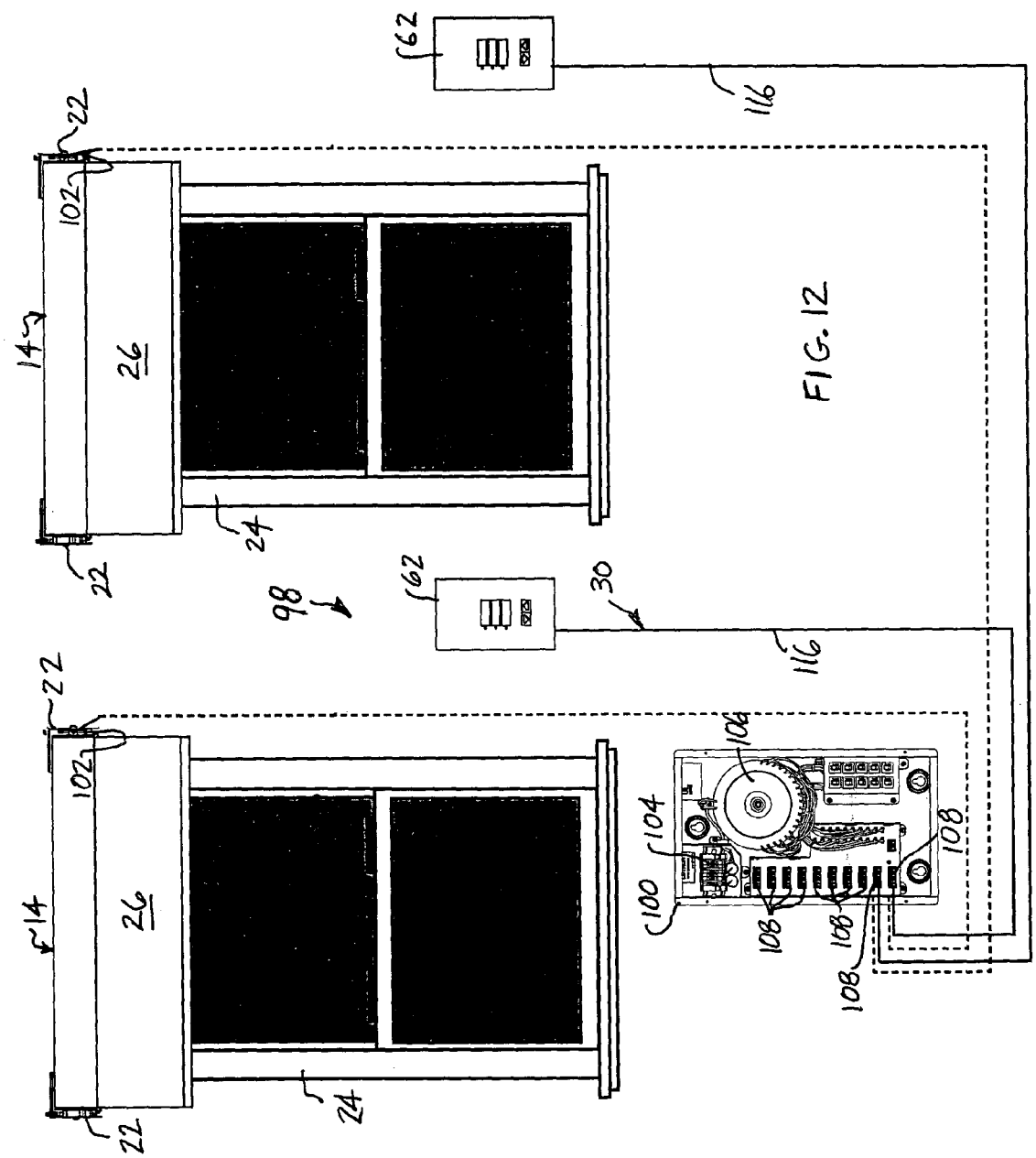
FIG. 12 is a view, schematic in part, of a motorized shade control system according to the present invention having power transmission panels.
Figures 13, 14, 15:
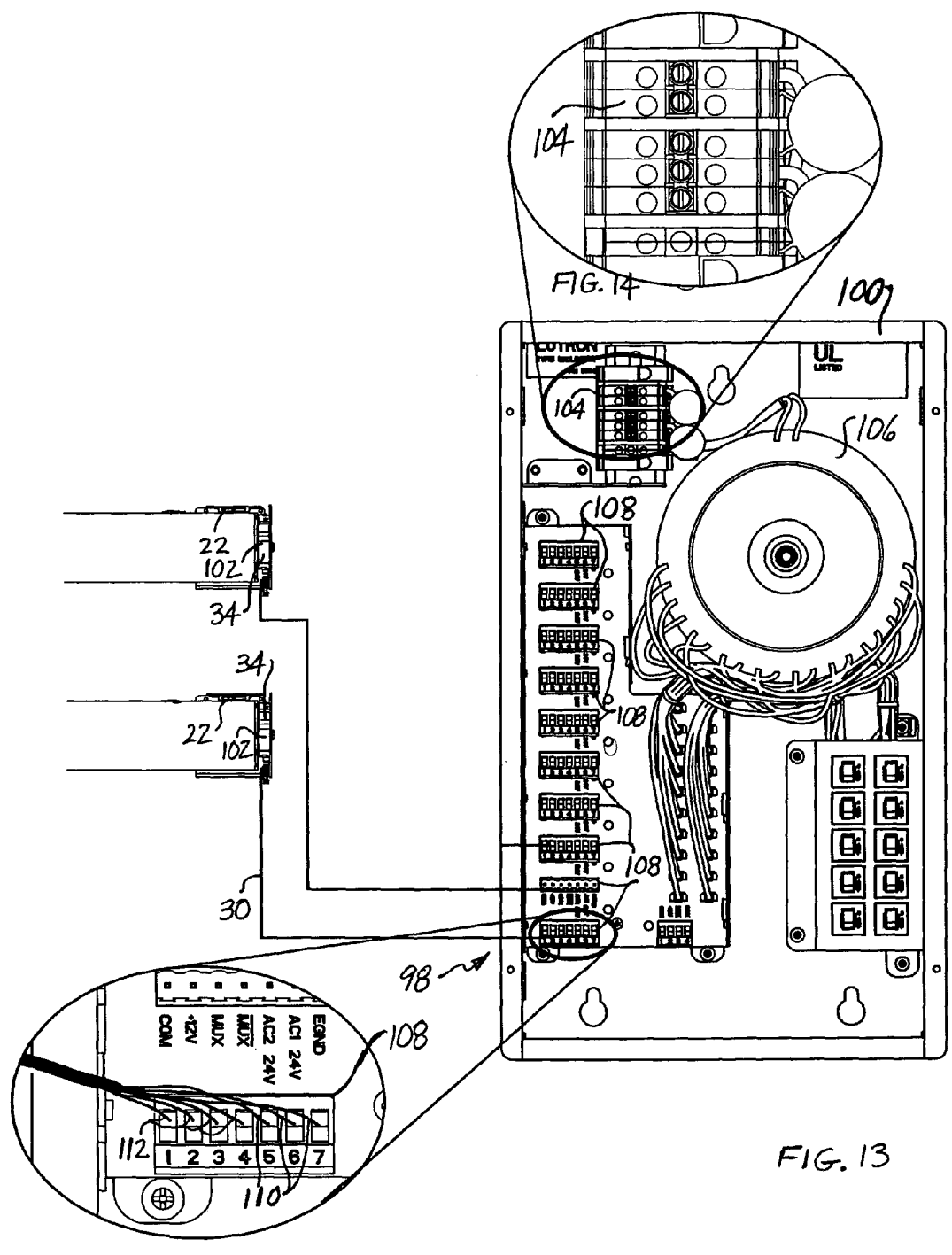
FIG. 13 is a view, schematic in part, of wiring connections between the power transmission panel and electronic drive units of FIG. 12.
FIG. 14 is an enlarged detail view of a portion of the power transmission panel of FIG. 13.
FIG. 15 is an enlarged detail view of a portion of the power transmission panel of FIG. 13.

As shown schematically in FIG. 12, the shade control system 98 includes keypad controllers 62 for controlling the electronic drive units 102 and for transmitting system programming signals. Each of the keypad controllers 62 is linked to the power transmission panel 100 by a four-conductor cable 116. As shown in FIG. 12, the conductors of cable 116 are attached to one of the terminal blocks 108 of the power transmission panel 100 such that the conductors of cable 116 are conductively connected to the four communication conductors 112 of one of the electronic drive units 102. The conductive connection between the conductors of cable 116 and the conductors 112 provides for transfer of command signals between the keypad controller 62 and the shade control system 98. The connection of the four-conductor cable 116 to the conductors 112 also powers the keypad controller 62.

Figure 16:
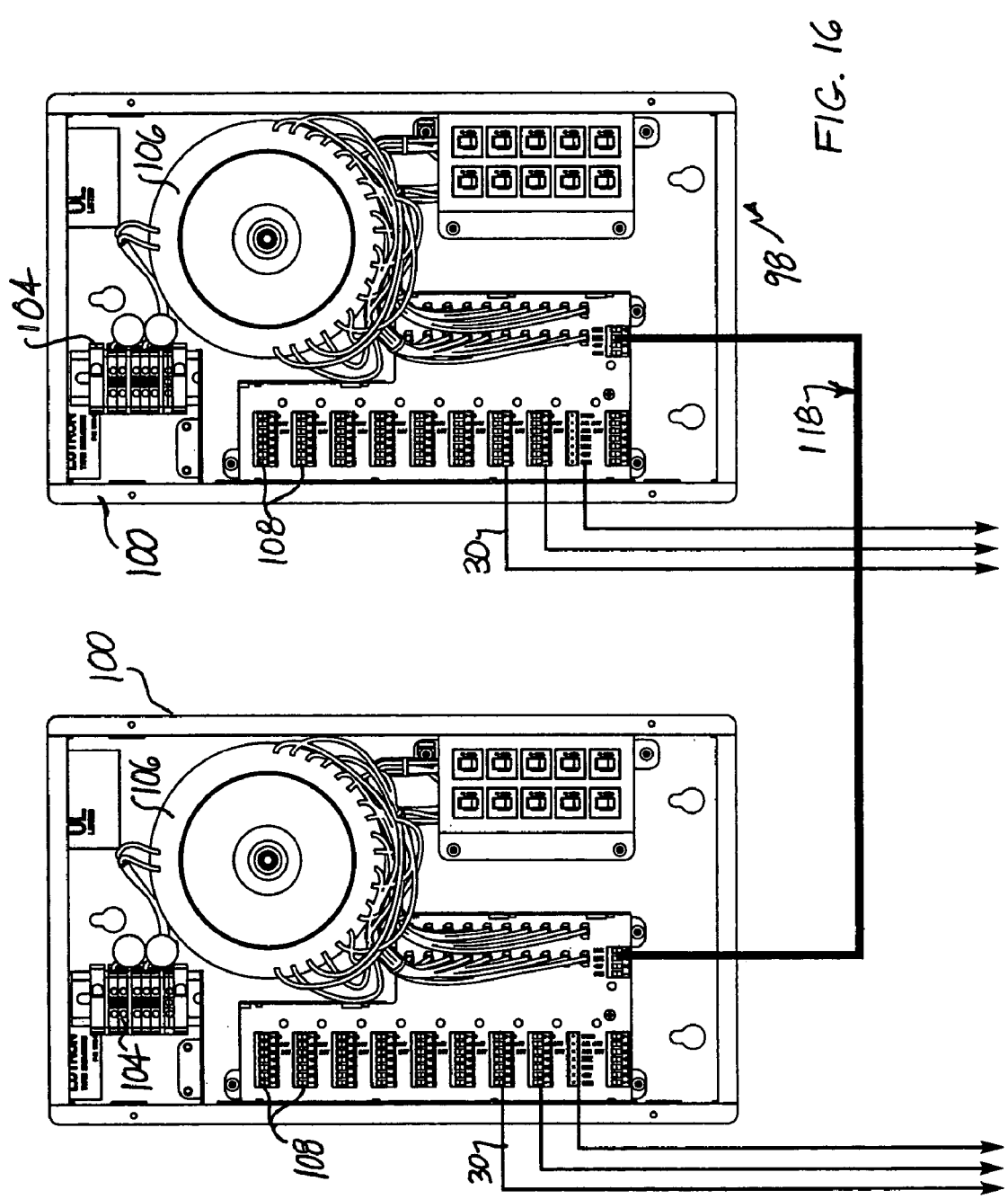
FIG. 16 is a view, schematic in part, of first and second power transmission panels linked by a communication cable.

Referring to FIG. 16, the shade control system 98 may include multiple power transmission panels 100 each capable of distributing power from a line-voltage source to ten electronic drive units 102. To provide a bus line communications bridge between the multiple power transmission panels 100, the shade control system 98 includes four-conductor communications cables 118, each linking two of the power transmission panels together.

Figure 17:
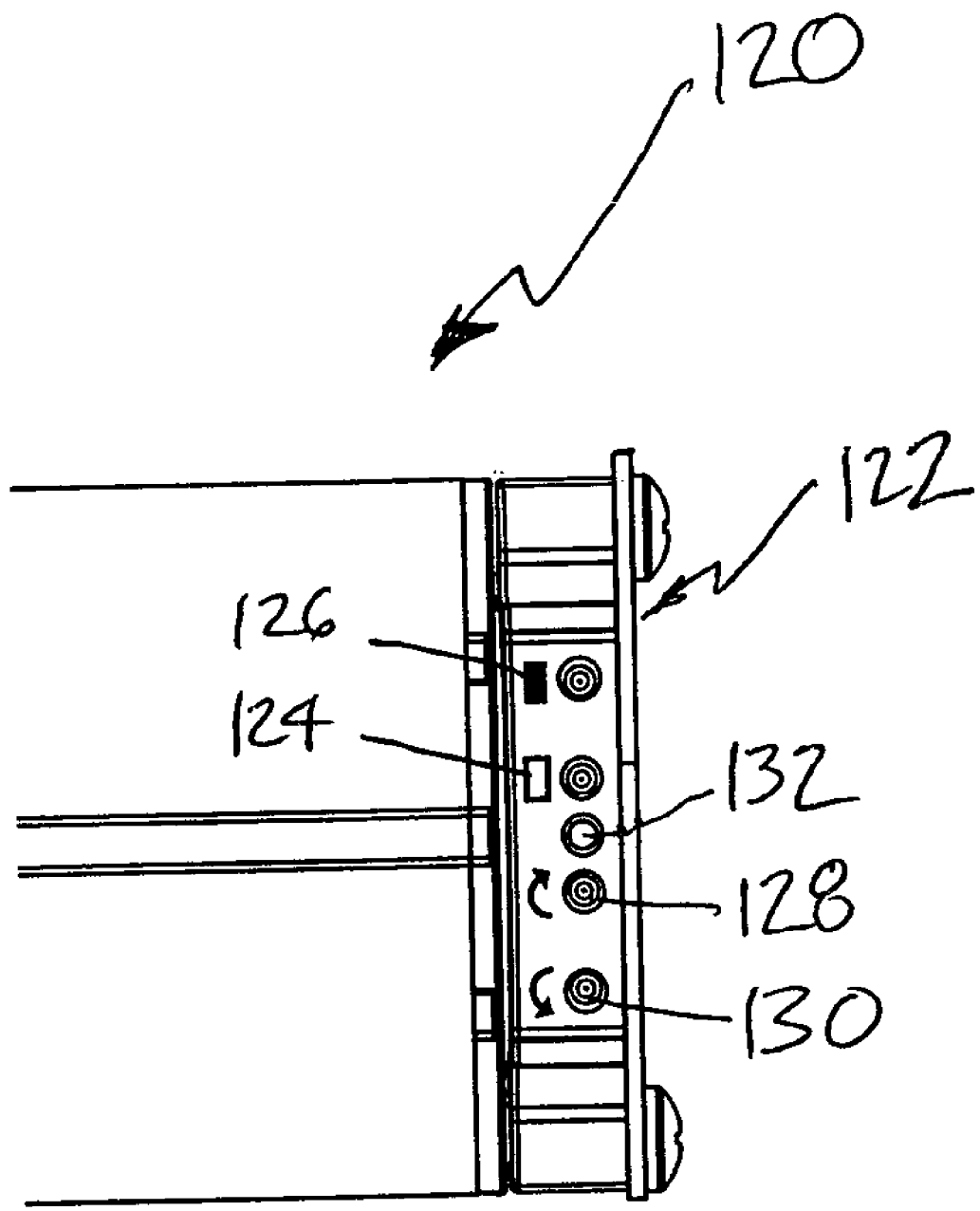
FIG. 17 is an elevation view of an electronic drive unit according to the present invention having a shade control panel for shade adjustment or system programming at the drive unit.

In the shade control system 10 shown in FIGS. 1 and 2, programming of the system could be achieved through the programmable microprocessor of any of the keypad controllers, contact closure interfaces or infrared receivers of the system. System programming could also be achieved through any of the drive units. As described above in regard to FIGS. 3 and 4, the electronic drive units 12 may include programmable microprocessors to provide for system programming via the electronic drive units 12 in addition to via the keypad controllers 28 or contact closure interfaces 88. Referring now to FIG. 17, there is shown an electronic drive unit 120 according to the present invention having a control panel 122 providing a user interface to the programmable microprocessor to program the system through the electronic drive unit 120.

The control panel 122 of electronic drive unit 120 includes an open limit button 124 and a close limit button 126. Buttons 124, 126 respectively provide for setting of the position the fabric shade of the associated motorized shade will occupy when a user actuates the full open and full close buttons 44, 46 of an associated keypad controller 28. The control panel 122 also includes first and second adjustment buttons 128, 130 for respectively directing the motor of the electronic drive unit 120 to rotate the roller tube 16 in opposite directions to set the desired full open and full close positions for the associated fabric shade. The control panel 122 also includes an LED indicator 132 providing visual indication to a user during programming of the shade control system.

II Configuration Using the System Network

The preferred manner in which the above-described constructions are used to program the shade control system of the present invention will now be discussed in greater detail. In general, the programming of the motorized shade control system of the present invention will include addressing of each component of the system. The programming of the control system will also include setting open and close limits for each of the electronic drive units (EDUs) and assigning EDUs to each of the keypad controllers, contact closure interfaces, or IR receivers included in the shade control system.

A. Addressing of System Components

For proper operation of the above-described shade control system of the present invention, each component included in the system must be given a unique address identifier to distinguish the components of the system from each other. As described above, the shade control system of the present invention utilizes a communication network in which all of the system components are connected to a common communications bus. The use of a common bus network provides for "soft addressing" of the system components in which a unique address can be automatically assigned to each component when a user enters a "system configuration mode." As will be described below, the system configuration mode is used to address components and to assign electronic drive units to keypad controllers, contact closure interfaces (CCI) or infrared receivers. The system configuration mode could also be activated from any one of the keypad controllers or IR transmitters, or from an alternate device or control system linked to the shade control system through a CCI.

The present invention provides for automatic addressing of system components, which results in each of the components having a unique address identifier associated with it. It should be understood, however, that the identifiers need not be assigned by the system according to any particular series or pattern and could, for example, be accomplished by random numbering. It is only required that the address identifiers be unique such that the system can distinguish one component of the system from another.

The shade control system of the present invention provides for addressing of system components from any one of the keypad controllers 28, 62, 64 as follows. A selected one of the keypad controllers 28, 62, 64 is placed in "system configuration mode" by pressing and holding both the "open" and "close" buttons 56, 58. It is preferable that more than a tapping engagement of the buttons is necessary, such as a sustained hold for several seconds for example, to prevent inadvertent activation of the system configuration mode. Following pressing and holding of the "open" and "close" buttons 56, 58 for the required time, the respective LED indicators 78, 79 next to those buttons will flash to indicate that the selected keypad controller is ready to begin addressing the system. Pressing the "open" button 56 at this point initiates automatic addressing by the microprocessor of the selected keypad controller, which assigns a unique identifying address to each component of the system.

While the system components are being addressed by the selected one of the keypad controllers 28, 62, 64, the "close" LED 79 will turn off and the "open" LED 78 will flash rapidly (e.g., 8 flashes per second) to indicate that the system components are being addressed. During this time, the "open" LEDs 78, 94 of the other keypad controllers 28, 62, 64 and CCIs 88, and the single LED 132 of the electronic drive units 120, will also flash rapidly. When each device has been addressed, the LEDs 78, 94, 132 will flash slowly (e.g., once per second) to indicate that addressing is complete and that the "system configuration mode" may be exited, such as by pressing and holding buttons 56, 58 of the selected keypad controller. The system could also be configured to provide for exiting of the system configuration mode from any keypad controller, drive unit, infrared transmitter or CCI of the system.

In addition to providing a visual indication of various programming stages, the lighting of the LEDs at keypad controllers, CCIs, and EDUs of the system also provides a confirmation of correct wiring. It should be understood that any CCI-connected device could be used, in a similar manner as described above for the keypad controllers, to enter the system address mode and to initiate component addressing. It should also be understood that the system could be configured to provide for system programming from the CCI itself without input to the CCI from an alternate device or control system connected to the CCI.

The "system configuration mode" may also be entered, and component addressing initiated, using infrared transmitter 70 as follows. The transmitter 70 is aimed at any keypad 64 or CCI 88 having an infrared receiver, or at any EDU 12, 102, 120 having an external IR receiver 82. In a similar manner to the above-described method of addressing from a keypad controller, the "system configuration mode" is entered by pressing and holding both the "open" and "close" buttons 72, 74 of the IR controller 70. Addressing is then initiated by pressing button 72.

Automatic addressing of the components of the shade control system may also be initiated via the control panel 122 of any one of the drive units 120 as follows. Pressing and holding the close limit button 126 of the control panel 122 for several seconds, for example, will place the control panel 122 in a "ready to address" mode. The single LED 132 will light steadily. Addressing of the system components by the microprocessor of the drive unit 120 is then initiated by pressing adjustment button 130. The single LED 132 will then flash quickly, indicating that system components are being addressed. During this time, the "open" LEDs 78, 94 of the other keypad controllers 28, 62, 64 and CCIs 88, and the single LED 132 of the electronic drive units 120, will also flash rapidly.

B. Setting EDU Limits

The shade control system of the present invention is also programmable to set an "open limit" position and a "close limit" position for each of the electronic drive units. These limits determine how far the associated shade fabric will travel when the electronic drive unit is directed to drive the shade fabric to the full open or full close positions. The shade limit positions may be set for an electronic drive unit 120 using its control panel 122 as follows. Pressing open limit button 124 of the control panel 122 actuates a "set open limit" for that EDU 120 causing the single LED 132 to shine steadily. The adjustment buttons 128, 130 of the control panel 122 are then used to move the associated shade fabric 26 to the desired full open position. With the shade fabric in the desired position, the user presses and holds the open limit button 124 for a required minimum time (e.g., five seconds). The LED 132 will flash during a brief period (e.g., two seconds) and then turn off to indicate that the current position for the EDU has been stored by the microprocessor as the open limit. In a similar fashion, the close limit button 126 of the control panel 122 provides for setting the desired close limit position using the adjustment buttons 128, 130 in a "set close limit mode" for the EDU. The single LED 132 signals setting status by flashing in the same manner as described above for the "set open limit mode".

The open and close limits can also be set using the keypad controllers 28, 62, 64 as follows. A "limit set mode" of system programming is entered by simultaneously pressing and holding the "open" and "raise" buttons 56, 60 of a selected one of the keypad controllers 28, 62, 64 for a minimum time (e.g., five seconds). The "close" LED 79 will flash rapidly (e.g., eight times per second) and the "open" LED 78 will flash slowly (e.g., once per second) to indicate entry to the "limit set mode". One of the electronic drive units assigned to the selected one of the keypad controllers 28, 62, 64 is then chosen for setting limits of the drive unit by pressing and releasing the "open" button 56. Each time button 56 is pressed and released, one of the EDUs assigned to the selected keypad controller will direct its motor to begin raising and lowering the associated shade fabric over a short distance (i.e., cycle the shade) to visually identify the EDU assigned to the keypad controller.

Pressing and releasing the "close" button 58 will select assigned EDUs in a reverse order compared to the order selected using the "open" button. When the shade fabric of a desired EDU is cycled, a user can adjust the shade fabric of that EDU to the desired limit positions using the raise and lower buttons 60, 61 of the keypad controller. Pressing and holding the "open" button 56 for several seconds sets the "open limit" position. The LEDs 78, 79 will then light continuously for two seconds to indicate that the open limit has been set. Similarly, pressing and holding the "close" button 58 for several seconds will set the "close limit" position for the EDU. A user may then select other EDUs for limit setting by pressing and releasing the open button 56. Pressing and releasing the close button 58 will select assigned drive units for limit setting in a reversed order compared to the order selected using the open button. The user then exits the "limit set mode" by simultaneously pressing and holding the "open" and "raise" buttons on the selected one of the keypad controllers 28, 62, 64 for several seconds.

IR transmitter 70 can be used to set open and close limits for the EDUs of the shade control system of the present invention by aiming the transmitter 70 toward a keypad controller 64, a CCI 88 that includes an infrared receiver or a drive unit including an external infrared receiver. The targeted keypad controller 64 or CCI 88 is placed in the "limit set mode" by simultaneously pressing and holding the "open" button 72 and "raise" button 76 of the IR transmitter 70 for several seconds. The IR transmitter 70 is then used in a similar manner as described above for the keypad controllers 28, 62, 64. The assigned EDUs for the targeted keypad controller 64 or CCI 88 are then selected in order by pressing and releasing the "open" or "close" buttons and limits are set by pressing and holding the "open" or "close" buttons for several seconds.

In the above discussion, the keypad controllers, CCI or infrared receivers of the system were described as being configured to provide for setting limits of only those drive units of the system that are assigned to it. Such a configuration is for convenience but is not a requirement of the present invention. The system could be configured to provide for limit setting of any drive unit of the system using any keypad controller, CCI or infrared receiver.

C. Assignment of EDUs

Assignment of electronic drive units 12, 102 and 120 of the shade control system of the present invention for control is accomplished in the following manner. Assignment determines which EDUs will be operated by each of the keypad controllers 28, 62, 64, CCI 88 or infrared receiver of the system. Assigning EDUs to a particular keypad controller or CCI will not affect assignments that are made with respect to other keypad controllers or CCIs of the shade control system. EDUs are assigned to a selected one of the keypad controllers 28, 62, 64 by the following steps. In a similar manner to the above-described component addressing, a user first enters the "system configuration mode" at a selected one of the keypad controllers 28, 62, 64 by simultaneously pressing and holding the "open" and "close" buttons 56, 58 for several seconds. The "open" and "close" LEDs 78, 79 will flash to indicate that the selected keypad is ready to be used for assignment of EDUs.

A drive unit "assignment mode" is entered from the "system configuration mode" by pressing the "close" button 58 of a selected keypad controller. The "open" LED 78 will turn off and the "close" LED 79 will flash slowly (e.g., once per second) to indicate that the selected controller is ready for assignment of EDUs. The shade fabric moves up to indicated unassigned or down to indicate assigned. The EDUs may be assigned (or un-assigned) individually with respect to the selected keypad controller according to the following two options. According to a first option, individual EDUs 120 may be assigned using the adjustment buttons 128, 130 of EDU control panel 122. The system preferably provides for toggling between assigned and unassigned in response to pressing of any button of the drive unit control panel 122.

According to the second option, individual EDUs can be assigned (or un-assigned) to the selected keypad controller using the keypad controller without accessing EDU control panels as follows. Pressing and releasing the "open" button 56 will cause one of the EDUs of the system to direct its motor to raise and lower the associated shade fabric over a short distance (i.e., "cycle" the shade fabric). Repeatedly pressing and releasing button 56 will select EDUs in order causing each EDU to cycle its shade fabric. Pressing and releasing the "close" button will select EDUs in a reverse order compared to the order selected using the "open" button. An EDU chosen in this manner may then be un-assigned or assigned to the selected one of the keypad controllers 28, 62, 64 by pressing the "raise" button 60 or "lower" button 61, respectively. When the assignment of EDUs to the selected one of the keypad controllers has been completed, a user exits the "system configuration mode" by pressing and holding the "open" button 56.

According to the above options, the EDUs are selected individually for assignment. It is conceivable that the system could be configured to provide for a group assignment of drive units. It is conceivable, for example, that the system could be configured to un-assign all of EDUs of the system when in the system configuration mode in response to a predetermined actuation of one or more of the actuators. Similarly, the system could be configured to assign all EDUs in response to a predetermined actuation of one or more of the actuators.

Assignment of EDUs to the keypad controllers 64 can also be accomplished by aiming an IR transmitter 70 towards the internal IR receiver of the keypad controller 64. In a similar manner to the above-described method using keypad control buttons, the open and close buttons 72, 74, and the raise/lower buttons 76, 77, of the transmitter 70 may be used to assign and un-assign EDUs to a targeted one of the keypad controllers 64. Similarly, an alternate device or control system connected to a contact closure interface (CCI) 88 having open, close, raise and lower enabled controls may be used to assign and un-assign EDUs to the CCI 88. Similarly, EDUs can be assigned to an EDU that has an IR receiver.

As described above, the motorized shade control system of the present invention utilizes a communication network in which each component of the system is connected to a common communication bus. The common bus facilitates configuration, or reconfiguration, of the system during various programming stages including system addressing, setting of EDU limit positions and assignment of EDUs to keypad controllers or CCIs. The construction of the communication network of the present invention provides for troubleshooting and reporting of operational errors that may occur. As described above, signals directing the control units 34 of the electronic drive units 12 to move the associated shade fabrics 26 will be transmitted to the EDUs from the keypad controllers 28, 62, 64 and CCIs 88 at various times during operation and configuration of the system 10. In the event that an EDU fails to move the associated shade in response to such a command, the control system 10 could be arranged to diagnose and report various failures or conditions that may be responsible. For example, the system could be arranged to check such a failing EDU for hardware conditions including motor stall, motor overheating, duty cycle and software problems including corrupted position data.

Because all of the system components are connected to a common communications bus, the system could be interrogated following an EDU failure to respond for any systemic conditions, such as excess number of devices or duplication of component addresses for example. Following diagnosis of an EDU failure to respond, the shade control system 10 of the present invention could provide for error reporting to the keypad controller or CCI from which the command signal originated. Error reporting at the originating device could be achieved by display using various combination of on/off or flash rate lighting conditions for the LEDs of the originating device. It is also conceivable that the keypad controllers or CCIs could be modified to include a display (e.g., an LCD) to report numbered codes at an originating device.

The control system of the present invention has been described herein for configuring and operating multiple roller shades having internal motors driving a roller tube. The present invention, however, is not so limited and could be used in other applications. For example, the system could be used to control shade rollers having external motors driving roller tubes. The present invention could also be applied to configure and operate other motor driven window treatments including roman shades and draperies, for example.

The system programming using the common-bus communication network of the present invention has been described with reference to keypad controllers having open limit, close limit and raise/lower adjustment actuators for controlling the operation of system drive units. The present invention is not limited to any particular arrangement of actuators, however. It is conceivable, for example, that the system could be configured to provide for the above described system programming using other types of controllers. System programming could be achieved from any controller in which shade fabric control signals, such as raising and lowering of the shade, can be distinguished by the system from programming signals.

III System Modifications

The shade control system 10 of the present invention facilitates configuration of system components, in the manner described above for example for addressing, limit setting, and assignment. The communication network of system 10 also facilitates modification of an established network as described below, to facilitate replacement of a device or combination of multiple networks without requiring loss of programming for the established network.

A. Device Replacement

Figure 18:
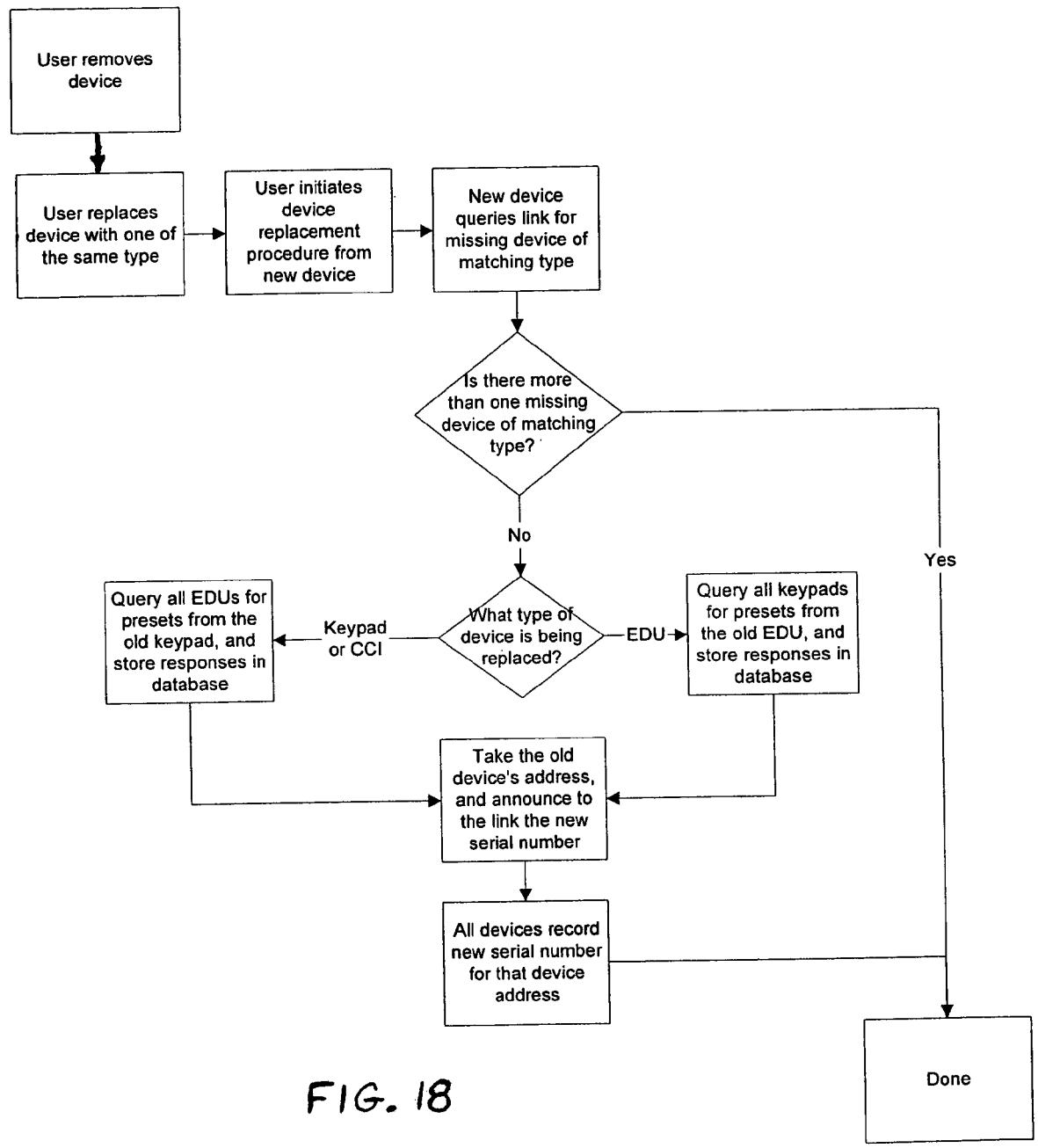
FIG. 18 is a schematic illustration of a procedure for replacement of a device in a shade control system according to the present invention.

Referring to FIG. 18, there is shown a procedure for replacement of a device in an established shade control system 10 of the present invention. Such replacement may be necessary following a failure of a device, for example. This replacement procedure occurs automatically upon initiation by a user following removal of a device from the system and replacement of a device of the similar type.

As described above, each of the EDUs and each of the keypads (or CCIs) preferably includes a programmable microprocessor. Each of the EDUs, therefore, is capable of maintaining a database of stored information that includes the preset shade position information for that EDU as well as the device address number and an associated unique serial number for each of the keypads (or CCIs) that are assigned to control that EDU. Similarly, each of the keypads (or CCIs) is capable of maintaining a database of stored information that includes the device address number and an associated unique serial number for each of the EDUs assigned to that keypad (or CCI) as well as the preset shade position information for each EDU assigned thereto. The resulting redundancy in the storage of the preset position information for the EDUs provides for reconstruction of the database of stored information on the replaced device without the need for access to the information stored on the replaced device that has been removed from the system. The system could also include a central processor, or some other device having data storage capability, for storing system information such as the above-described preset position information to provide a backup to the information stored at the keypads (or CCIs).

The database of stored information from a replaced device is reconstructed on a replacement device using the information redundantly stored by the devices that the replaced device controlled, or was controlled by, in the following manner. As shown in the flowchart of FIG. 18, a replacement EDU needing reconstruction of the database of stored information from the EDU it has replaced, will query all keypads and CCIs for presets that were associated with the replaced EDU. The replacement EDU will store all responses in its own database of stored information. In a similar manner, a replacement keypad (or CCI) will query all EDUs in the system for presets associated with the keypad (or CCI) that was removed from the system and stores all responses in it own database.

Once the database of stored information for the replacement device has been reconstructed from the query responses received from that devices that the removed device controlled, or was controlled by, the unique serial number for the replacement device will be announced. In response to the announcement of the serial number, each device in the system records the announced serial number at the device address number for that device.

B. Network Combinations

There may be occasions where it is desirable to link a first established shade control system with a second control system separately established from the first system. Such a situation could occur, for example, during construction or remodeling of a facility.

The separately established shade control systems would include separately addressed devices. Such a situation creates the possibility that a merger of the previously separate systems would result in multiple sets of devices sharing a common device address. To resolve the address conflict in prior art control systems, reprogramming of the conflicting devices, or of the entire system, was required. Reprogramming can be a time-consuming task, particularly where reprogramming of an entire system is required.

Figure 19:
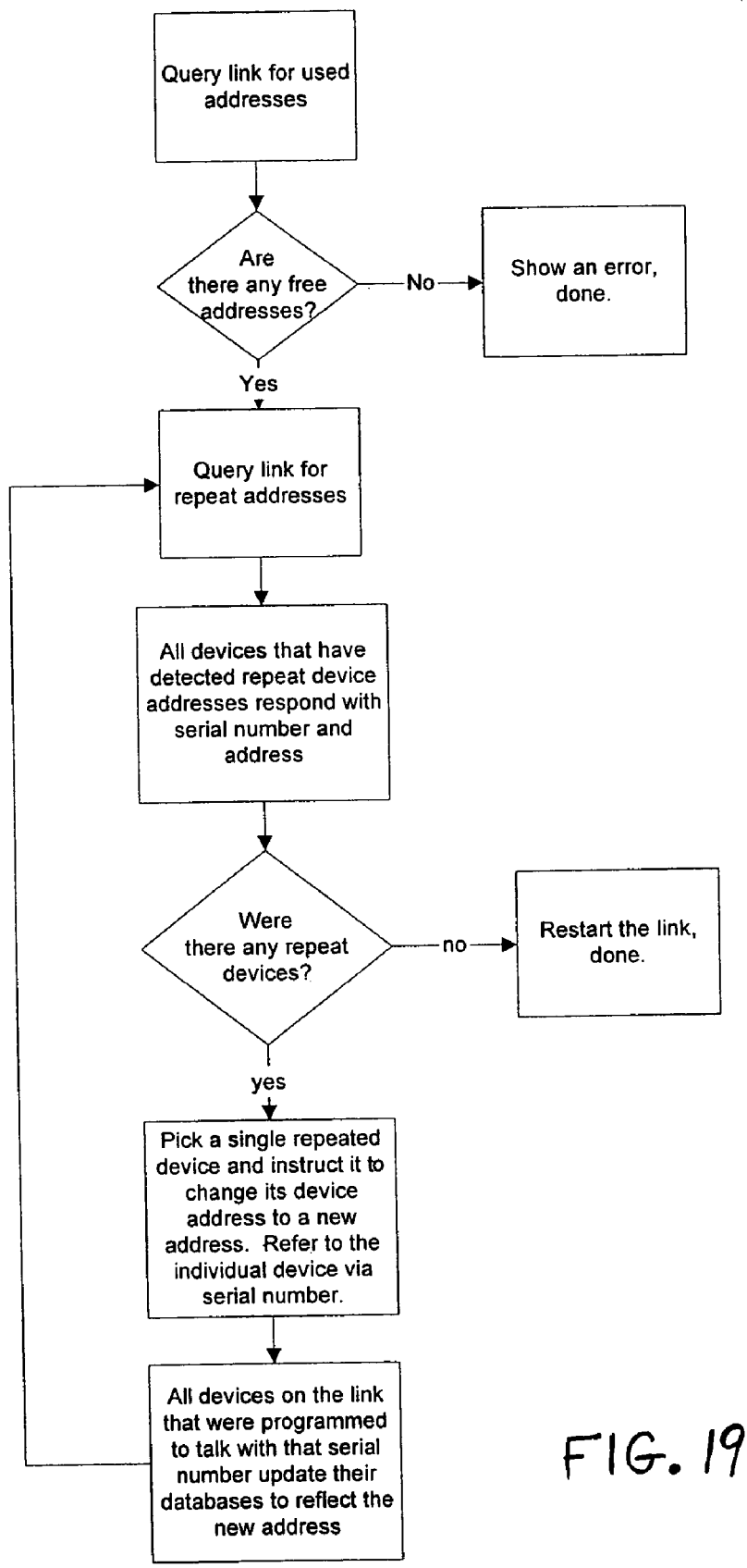
FIG. 19 is a schematic illustration of a procedure for resolving address conflicts during merger of separately established shade control systems according to the present invention.

Referring to FIG. 19, there is shown a flowchart for a procedure of resolving address conflict issues during merger of previously separate control systems. The procedure resolves address conflict issues using unused addresses while maintaining the system programming for each of the systems.

To provide for resolution of conflicting addresses, each device in a control system according to the present invention stores the serial number, which is a unique identifier, for each device that it is programmed to interact with. Following merger of formerly separate systems, each device is queried to identify repeated device addresses. If any repeated addresses are identified, one of the devices is selected for change in its device address to an available unused address. The newly assigned device address is reported to the system along with the serial number for the device. Any device that was programmed to interact with the newly addressed device updates its database to reflect the newly assigned address information.

IV. Hand-Held Programmer

Figure 20:
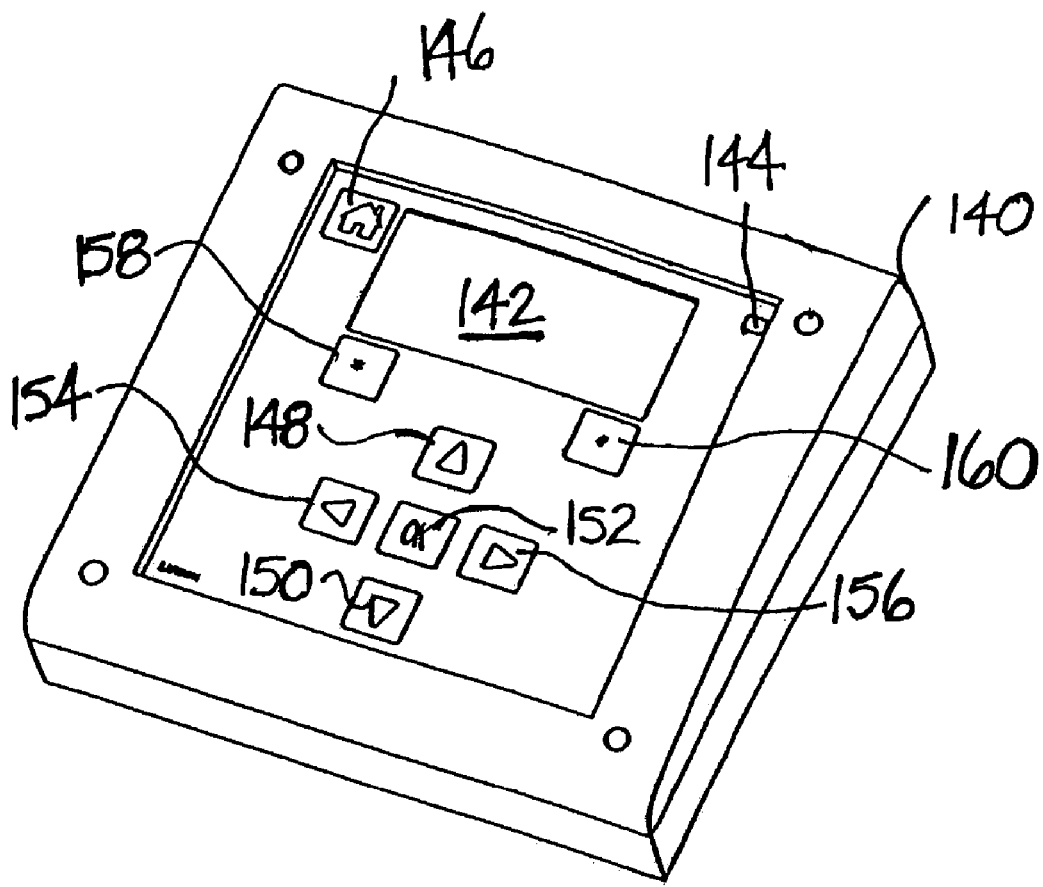
FIG. 20 is a perspective view of a hand-held programmer connectable to a shade control system of the present invention.

Referring to FIG. 20, there is shown a hand-held programmer ("HHP") 140 that is capable of performing system programming including the above-described functions of addressing, limit setting and assignment, for example. With respect to addressing, the HHP 140 provides for automatic addressing, in the above-described manner, as well as manual addressing. The manual addressing mode provides for addressing of selected devices in a selected order. The HHP 140 also provides for system wiring testing and other troubleshooting functions.

The HHP 140 may also be used during device replacement, described above, to program a replacement device with the database of stored information from a device that is to be removed from the system. Following connection of the HHP 140 to the system, the HHP 140 would select the device targeted for removal and retrieve the database of information stored by the microprocessor of the selected device. Following removal of the selected device and replacement with a device of the same type, the HHP 140 would program the information that was retrieved from the selected device into a database of stored information for the replacement device. This procedure differs from the above-described automatic procedure, which involved an indirect reconstruction of database information based on redundant information stored on device that a removed device controlled, or was controlled by. In contrast, the present manual procedure using the HHP 140 involves direct transfer of the information from the selected and removed device into the replacement device via the HHP.

The HHP 140 may be connected to the communication network of the shade control system 10 through any access point which may provided at a programming jack or on a power panel or keypad, for example. Although a wired connection is preferable, it is not a requirement. It is conceivable that a programming device could use IR, or some other wireless form of communication, to access and communicate with the control system 10.

The HHP 140 provides for a more user-friendly interface than is practical for the EDUs, keypads, or CCIs of the shade control system 10. The HHP 140 includes a liquid crystal display (LCD) 142 for displaying a variety of information to a user to facilitate the above described functions that can be performed by HHP. Such information includes menu option screens, numeric selection screens for modifying selected parameters, and screens for displaying basic information regarding the system. An LED 144 indicates when power is present in the LCD 142.

The HHP 140 includes a variety of user-actuated buttons. A home screen button 146 provides for return of the HHP 140 to a home state. The HHP 140 includes up and down buttons 148, 150, for scrolling though options presented to a user on the LCD 142, and an "OK" button 152 for activating a highlighted command or function. Left and right buttons 154, 156 provide for increasing or decreasing a numeric value presented by the LCD 142 on a numeric selection screen. This feature would be used, for example, to select a device from the system based on its address number. The HHP 140 also includes buttons 158, 160 located adjacent to opposite lower corners of the LCD 142. The buttons 158, 160 provide for selection of options displayed in the respective corners of the LCD 142 for selection of a previous screen or a next screen, for example.

In addition to system programming and diagnostics functions, the user-friendly screen displays of the HHP 140 could be used to facilitate adjustment of system devices. The EDUs used in shade roller systems, for example, are typically programmed with a default motor speed. The EDUs, however, may be reprogrammed to adjust the motor speed. The HHP 140 could be set up to facilitate such EDU reprogramming by providing "EDU options" including an "adjust speed" option. A user selecting the "adjust speed" option could then be prompted to choose between "select RPM" and "restore default RPM" options. Selection of the "select RPM" option would result in the display of a numeric selection screen. As described above, the left and right buttons 154, 156 of HHP 140 would then be actuated by a user to raise and lower the numeric value displayed on the screen to the desired RPM setting for a selected EDU.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A shade control system comprising:
a plurality of drive units each having a motor adapted for moving an associated shade member;
a plurality of drive unit controllers each capable of generating command signals for directing at least one of the drive units to move its associated shade member;
a communication bus capable of transmitting the command signals, each of the drive units and drive unit controllers connected to the communication bus in a common arrangement such that each one of the drive units and drive units controllers can communicate with every other drive unit and drive unit controller connected to the communication bus; and
a microprocessor associated with at least one of the drive units and drive unit controllers, the microprocessor being programmed to automatically address each one of the drive units and drive unit controllers with a unique identifier.

2. The shade control system according to claim 1, wherein the plurality of drive unit controllers includes at least one wall-mountable keypad controller having actuators for controlling the movement of the associated shade member of at least one of the drive units.

3. The shade control system according to claim 2 further including a hand-held programmer connectable to the communication bus, the programmer including liquid crystal display for presenting information to a user in the form of menu selection screens, numeric value screens and basic system information, the hand-held programmer further including a plurality of user-actuable buttons including a first pair of buttons for scrolling through a list of options displayed on a menu selection screen, the buttons further including a second pair of buttons for modifying a numeric value displayed on a numeric value screen.

4. The shade control system according to claim 1, wherein the plurality of drive unit controllers includes at least one contact closure interface capable of generating command signals for controlling the movement of the associated shade member of at least one of the drive units, the contact closure interface having multiple inputs for connection of an alternate device or control system to the contact closure interface.

5. The shade control system according to claim 1, wherein the drive units are adapted to be associated with a roller tube having a shade fabric wound thereon and wherein the motor of each drive unit is adapted to engage the roller tube for rotation of the tube.

6. The shade control system according to claim 5, wherein the plurality of drive unit controllers includes at least one keypad controller having an open limit actuator and a close limit actuator for generating command signals for moving the associated shade fabric of at least one of the drive units to an open limit position and a close limit position, each of the at least one keypad controllers further including a raise actuator and a lower actuator for generating command signals for moving the associated shade fabric of at least one of the drive units through raise and lower position adjustments.

7. The shade control system according to claim 6, wherein the at least one keypad controller further includes at least one preset actuator each moving the shade fabric of at least one of the drive units to a preset position.

8. The shade control system according to claim 6, wherein the at least one keypad controller includes an infrared transmissible window for receiving an infrared signal within an interior of the keypad controller from a remotely located infrared transmitter.

9. The shade control system according to claim 8, wherein the remotely located infrared transmitter includes an open limit actuator and a close limit actuator for generating command signals for moving the associated shade fabric of at least one of the drive units to an open limit position and a close limit position, the infrared transmitter further including a raise actuator and a lower actuator for generating command signals for moving the associated shade fabric of at least one of the drive units through raise and lower position adjustments.

10. The shade control system according to claim 9, further including at least one external infrared receiver connectable to one of the drive units for receiving infrared signals from an infrared transmitter.

11. The shade control system according to claim 6, wherein each one of the keypad controllers includes a microprocessor programmed to automatically address all system components in response to actuation of the keypad controller actuators in a predetermined combination of actuators or actuation sequence.

12. The shade control system according to claim 11, wherein the microprocessor of each keypad controller is programmed to enter a system programming mode in response to simultaneous pressing and holding of the open and close limit actuators of the keypad controller and to initiate addressing of system components in response to subsequent pressing of the open limit actuator of the keypad controller.

13. The shade control system according to claim 11, wherein the microprocessor of each keypad controller is programmed to enter a limit setting program mode in response to simultaneous pressing and holding of the open limit and raise actuators of the keypad controller and to subsequently select drive units assigned to the keypad controller in response to actuation of either the open or close actuators of the keypad controller, and wherein the microprocessor is further programmed to set open and close limits for a selected one of the drive units following adjustment of the shade fabric by actuation of the raise or lower actuators of the keypad controller and subsequent pressing and holding of the open limit and close limit actuators, respectively.

14. The shade control system according to claim 11, wherein the microprocessor of each keypad controller is programmed to enter a drive unit assignment mode in response to simultaneous pressing and holding of the open and close limit actuators of the keypad controller and subsequent pressing of the close button, and wherein the microprocessor is further programmed to (i) subsequently select drive units of the system in response to pressing and release of the open or close actuators of the keypad controller, and (ii) to assign or unassign a selected one of the drive units to the keypad controller in response to actuation of the lower and raise actuators, respectively.

15. The shade control system according to claim 5, wherein each of the plurality of drive units includes a control unit having a programmable microprocessor and a control panel having actuators adapted for raise and lower adjustment of the shade position and setting of open and close limits for the associated shade panel, respectively, and wherein the microprocessor of each drive unit is programmed to initiate automatic addressing of all system components in response to pressing and holding of the close limit actuator and subsequent pressing and releasing of the lower adjustment actuator.

16. A motorized shade control system comprising:

a plurality of drive units each having a motor adapted for engaging the roller tube of a motorized shade for rotation of the tube in each of opposite directions of rotation for raising and lowering a shade fabric wound onto the roller tube, each drive unit further including a control unit having a programmable microprocessor programmed to control the operation of the associated motor, and a plurality of drive unit controllers each capable of generating command signals for directing the control unit of at least one of the drive units to move the associated shade fabric, each of the drive units and drive unit controllers connected to a communication bus in a common arrangement in which each of the drive units and drive unit controllers can communicate with every other one of the drive units and drive unit controllers, the microprocessor of each drive unit being programmed to initiate an automatic addressing of each of the drive units and drive unit controllers connected to the communication bus.

17. The motorized shade control system of claim 16, wherein the controllers include at least one wall-mountable keypad controller having actuators for generating signals directing the control unit of at least one of the drive units to respectively move the associated shade fabric to a selected one of an open limit position, a close limit position, and through raise and lower adjustments.

18. The motorized shade control system of claim 16, wherein the controllers include at least one contact closure interface generating command signals in response to user-actuation of a device or control system connected to the contact closure interface, the command signals directing the control unit of at least one of the drive units to respectively move the associated shade fabric to a selected one of an open limit position, a close limit position, and through raise and lower adjustments.

19. A method of controlling a motorized shade system comprising the steps of:

providing a plurality of drive units each having a motor adapted for moving an associated shade member;

providing a plurality of drive unit controllers each capable of generating command signals for directing at least one of the drive units to move its associated shade member;

connecting each of the drive units and drive unit controllers to a communication bus in a common arrangement in which each of the drive units and drive unit controllers can communicate with every other drive unit and drive unit controller connected to the communication bus;

including a plurality of keypad controllers in the drive unit controllers, each keypad controller including actuators for generating signals to direct movement of a shade member associated with at least one of the drive units:

providing a programmable microprocessor for each of the keypad controllers; and programming the microprocessor of each of the keypad controllers to initiate an automatic addressing of each of the drive units and drive unit controllers of the system in response to actuation of the keypad controller actuators in a predetermined combination of actuators or actuation sequence.

20. The method of claim 19, wherein the shade member associated with each of the drive units is a shade fabric windingly received by a roller tube rotated by the motor of the drive unit and wherein the actuators of each keypad controller include open limit and close limit actuators for respectively directing the at least one drive unit to move the associated shade fabric to open limit and close limit positions and raise and lower actuators for adjusting the position of the shade fabric, and wherein the step of actuating the actuators to initiate addressing of a selected one of the keypad controllers includes the steps of simultaneously pressing and holding the open and close limit actuators and subsequently pressing the open limit actuator.

21. The method according to claim 20, including the further steps of:

programming the microprocessor of each of the keypad controllers to assign drive units to the keypad controller in response to actuation of the keypad controller actuators in a predetermined combination of actuators and/ef or actuation sequence; and assigning drive units to a selected one of the keypad controllers by cycling through the drive units of the system, and selectably assigning or unassigning chosen ones of the drive units to the selected keypad controller.

22. The method according to claim 21, including the further steps of:

programming the microprocessor of each of the keypad controllers to set open and close limits for the drive units assigned to the keypad controller in response to actuation of the keypad controller actuators in a predetermined combination of actuators or actuation sequence; and modifying open and close limits for the drive units assigned to a selected one of the keypad controllers by cycling through the drive units assigned to the selected keypad controller, adjusting the position of the shade fabric associated with a chosen one of the assigned drive units, and setting the open and close limit positions.

23. The method according to claim 22, wherein the step of modifying open and close limits for drive units assigned to a selected one of the keypad controllers includes the steps of:

entering a limit set mode by simultaneously pressing and holding the open limit and raise adjustment actuators of the selected keypad controller;

cycling through the drive units assigned to the selected keypad controller in a selected one of a forward and reverse order by respectively pressing either the open or close actuators of the keypad controller;

adjusting the position of a chosen one of the assigned drive units by actuating the raise or lower adjustment actuator of the selected keypad controller; and setting the open and close limit positions by respectively pressing and holding the open limit and close limit actuators of the selected keypad controller.

24. The method according to claim 22, wherein the step of providing keypad controllers includes the step of locating an LED adjacent a plurality of the actuators of each keypad controller to provide visual indicators during the steps of addressing drive units and drive unit controllers, assigning drive units to keypad controllers, and modifying open and close limits of the drive units.

25. The method according to claim 21, wherein the step of assigning drive units to a selected one of the keypad controllers includes the steps of:

entering a system configuration mode by pressing and holding the open and close limit actuators of the selected keypad controller;

subsequently pressing and releasing either the open limit button or close limit actuators to select drive units of the system; and assigning or unassigning a selected one of the system drive units by pressing the lower or raise adjustment actuators respectively.

26. The method according to claim 21, wherein the microprocessor of each of the keypad controllers is programmed to direct the drive units to raise and lower the associated shade fabric of the drive units over a short distance during the cycling of drive units to provide a visual indicator for a chosen drive unit.

27. The method of claim 19, wherein each of the shade member associated with each of the drive units is a shade fabric windingly received by a roller tube rotated by the motor of the drive unit and wherein the step of providing a plurality of drive units includes the steps of providing a programmable microprocessor for each of the drive units and providing a control panel for each of the drive units, the control panel having actuators for raise and lower adjustment of the position of the associated shade fabric and for setting open and close limit positions, respectively, and wherein the method includes the further steps of:

programming the microprocessors of the drive units to initiate an automatic addressing of all of the drive units and drive control units by a selected one of the drive unit microprocessors in response to pressing and holding of the close limit actuator of the drive unit control panel and subsequent pressing of the lower adjustment actuator; and initiating automatic addressing by pressing and holding the close limit actuator of one of the drive unit control panels and subsequently pressing the lower adjustment actuator.

28. The method according to claim 19 further including the steps of:

providing a programmable microprocessor for each of the drive units and each of the drive unit controllers;

addressing each of the drive units and each of the drive unit controllers with a device address number;

assigning at least one drive unit to each of the drive unit controllers for control by the drive unit controller;

setting preset positions for the shade member of each drive unit;

programming the microprocessor of each drive unit and drive unit controller to create a database of stored information that includes the device address number and an associated unique serial number for each of the drive units and drive unit controllers of the system;

programming the microprocessor of each drive unit to include in the database of stored information its preset position information as well as the device address numbers of all drive unit controllers assigned to it; and programming the microprocessor of each drive unit controller to include in the database of stored information the device address numbers of all drive units assigned to it as well as the preset position information for the assigned drive units.

29. The method according to claim 28, further including the steps of:

removing one of the drive units or one of the drive unit controllers from the system and replacing it with a new device of the same type having a programmable microprocessor and a unique serial number;

querying each of the drive units and drive unit controllers of the control system to identify the device address numbers for all drive unit controllers or drive units respectively assigned to the removed device as well as the preset position information associated with the assignments;

storing the identified device address numbers and preset position information in a database of stored information on the microprocessor of the new device; and modifying the database of stored information for each of the drive units and drive unit controllers of the system to associate the unique serial number of the new device at the device address number for the removed device.

30. The method according to claim 28, further including the steps of:

identifying at least one drive unit or drive unit controller for removal from the control system;

operably connecting a programming device to the communication bus of the control system, the programming device capable of accessing and retrieving the stored information from the microprocessor of a drive unit or drive unit controller and programming the retrieved information into the microprocessor of another drive unit or drive unit controller;

accessing and retrieving the stored information from the microprocessor of each of the identified drive units or drive unit controllers using the programming device;

removing each of the identified drive units or drive unit controllers from the system and replacing it with a new device of the same type having a microprocessor and a unique serial number;

programming the information retrieved from each of the removed drive units or drive unit controllers into the microprocessor of the new device replacing the removed drive unit or drive unit controller using the programming device; and updating the database of stored information for each of the drive units and drive unit controllers of the system to identify the serial number of the new device at the device address number for each of the identified and replaced devices.

31. The method according to claim 28, further including the steps of:

linking the common communication bus of a first shade control system having addressed drive units and drive unit controllers with the communication bus of a second shade control system having separately addressed drive units and drive unit controllers such that a merged control system is formed;

querying all of the drive units and drive unit controllers of the merged control system to identify repeated device address numbers;

selecting one drive unit or drive unit controller associated with each of the repeated device address numbers and changing its device address number to a device address number that is unused in the merged control system; and updating the stored information for each of the drive units or drive unit controllers assigned to the selected drive unit or drive unit controller to associate the new device address number with the serial number of the selected drive unit or drive unit controller.

* * * * *

UNITED STATES PATENT AND TRADEMARK OFFICE
CERTIFICATE OF CORRECTION

| | | |
|---|---|---|
| PATENT NO. | : 6,983,783 B2 | |
| DATED | : January 10, 2006 | |
| INVENTOR(S) | : Lawrence R. Carmen, Jr. et al. | |

It is certified that error appears in the above-identified patent and that said Letters Patent is hereby corrected as shown below:

<u>Column 1,</u>
Line 53, change "controllers." to -- controller. --.

<u>Column 10,</u>
Line 66, change "indicated" to -- indicate --.

<u>Column 11,</u>
Line 30, after "of" and before "EDUs", insert -- the --.

<u>Column 12,</u>
Line 9, after "addresses", insert -- , --.
Line 14, change "combination" to -- combinations --.
Line 47, after "above", insert -- , --.
Line 47, after "example", insert -- , --.
Line 61, after "replacement of a device of", change "the" to -- a --.

<u>Column 13,</u>
Line 14, after "information" and before "such", insert -- , --.
Line 15, after "information" and before "to", insert -- , --.
Line 29, change "it" to -- its --.
Line 33, after "from" and before "devices", change "that" to -- the --.

<u>Column 14,</u>
Line 33, after "on" and before "that", change "device" to -- devices --.
Line 40, after "point", insert -- , --.
Line 40, after "may", insert -- be --.
Line 51, after "by", insert -- the --.

<u>Column 15,</u>
Line 36, after "drive" and before "controllers", change "units" to -- unit --.

<u>Column 17,</u>
Line 18, change "panel" to -- member --.

<u>Column 18,</u>
Line 15, after "units", change ":" to -- ; --.
Line 42, delete "and/ef".

UNITED STATES PATENT AND TRADEMARK OFFICE
CERTIFICATE OF CORRECTION

PATENT NO. : 6,983,783 B2
DATED : January 10, 2006
INVENTOR(S) : Lawrence R. Carmen, Jr. et al.

It is certified that error appears in the above-identified patent and that said Letters Patent is hereby corrected as shown below:

Column 19,
Line 28, delete "button".
Line 40, change "member" to -- members --.

Signed and Sealed this

Sixteenth Day of May, 2006

JON W. DUDAS
*Director of the United States Patent and Trademark Office*